United States Patent
Grahl et al.

(10) Patent No.: US 10,668,426 B2
(45) Date of Patent: Jun. 2, 2020

(54) PROCESS FOR PRODUCING AN ADSORPTION UNIT AND ADSORPTION UNIT

(71) Applicant: LINDE AKTIENGESELLSCHAFT, Munich (DE)

(72) Inventors: Matthias Grahl, Munich (DE); Christian Voss, Geretsried (DE); Helko Schneider, Wolfratshausen (DE); Philipp Keil, Regensburg (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 196 days.

(21) Appl. No.: 15/805,310

(22) Filed: Nov. 7, 2017

(65) Prior Publication Data

US 2018/0126320 A1    May 10, 2018

(30) Foreign Application Priority Data

Nov. 8, 2016 (EP) .................................. 16020438

(51) Int. Cl.
*B01D 53/04* (2006.01)
*B01J 20/34* (2006.01)
*B01J 8/02* (2006.01)
*B01J 8/00* (2006.01)

(52) U.S. Cl.
CPC ........ *B01D 53/0431* (2013.01); *B01J 8/0015* (2013.01); *B01J 8/0214* (2013.01); *B01J 20/345* (2013.01); *B01D 2257/504* (2013.01); *B01D 2257/80* (2013.01); *B01D 2259/4009* (2013.01); *B01J 2208/0069* (2013.01); *B01J 2208/00752* (2013.01); *B01J 2219/00024* (2013.01)

(58) Field of Classification Search
CPC .............. B01D 53/0431; B01D 53/261; B01J 2208/0069; B01J 2219/00024; B01J 8/0015
USPC ......................... 585/820, 821, 823, 824, 825
See application file for complete search history.

(56) References Cited

U.S. PATENT DOCUMENTS

| 6,086,659 | A | 7/2000 | Tentarelli |
| 8,721,893 | B2 * | 5/2014 | Tavlarides ........... B01J 20/3204 210/660 |
| 2006/0254420 | A1 | 11/2006 | Monereau et al. |
| 2011/0206573 | A1 | 8/2011 | Ackley et al. |

OTHER PUBLICATIONS

European Search Report, EP Appln. 16020438.4-1370, Munich, Germany, dated May 29, 2017, 5 pages.

* cited by examiner

*Primary Examiner* — Thuan D Dang
(74) *Attorney, Agent, or Firm* — Millen White Zelano & Branigan, PC; Brion P. Heaney

(57) ABSTRACT

A process for producing an adsorption unit is disclosed, wherein an adsorber bed of the adsorption unit is filled with a bed of an adsorbent which is selected from a multitude of adsorbents by a test method, wherein, in the test method, a particle of each adsorbent is repeatedly laden with a sorbate and regenerated again, which converts the particle to an aged particle, and a fracture property B of the aged particle of each adsorbent is determined, wherein the adsorbent for the bed is selected depending on the fracture property B determined from the multitude of adsorbents.

17 Claims, 6 Drawing Sheets

PROCESS FOR PRODUCING AN ADSORPTION UNIT AND ADSORPTION UNIT

CROSS REFERENCE TO RELATED APPLICATIONS

This application claims priority from European Patent Application EP 16 020 438.4 filed on Nov. 8, 2016.

BACKGROUND OF THE INVENTION

The invention relates to a process for producing an adsorption unit, to a retooling process for an adsorption unit, and to an adsorption unit produced by the production process.

In industrial plants, there is frequent use of apparatuses for prepurification by means of adsorption, for example for drying large fluid volumes, which feature a high throughput. For example, in cryogenic air fractionation plants, water, $CO_2$ and further trace impurities are separated from raw air in such apparatuses, in order that these impurities do not condense and hence lead to problems in downstream process steps, especially compression and cooling.

Typically, for this purpose, radial adsorbers, for example, are used, since these are suitable for large flow volumes. These are frequently of cylindrical construction, wherein the fluid to be cleaned flows through a hollow cylinder filled with a bed of an adsorbent from the inside outward or from the outside inward.

EP 0 402 783 A2 describes a radial adsorber of this kind, in which a reactor housing is of essentially cylindrically symmetric construction about a vertical axis.

The adsorbent frequently comprises regular bodies or particles having a defined size, for example beads having a diameter of a few millimetres. The individual adsorbent particles are subjected to mechanical stress by adsorption, which is also called loading, since they swell, for example, and/or the heat of adsorption released causes thermal stresses in the material. Stresses likewise occur in the regenerating of the particles, since the particles contract, for example. In cyclical operation of an adsorption unit, this can lead to breakup of the particles. The fragments of the particles can be discharged, for example, through the orifices in the inner or outer basket.

Overall, this can reduce the adsorption capacity of the radial adsorber. In addition, it can lead to formation of a region in the hollow cylinder without adsorbent, through which the fluid can flow through the radial adsorber in uncleaned form. Then the bed has to be replenished again, in order to maintain the drying properties of the radial adsorber. This can result in frequent and unplanned shutdowns of an industrial plant.

Against this background, one problem addressed by the invention is that of providing a process for producing an improved adsorption unit.

SUMMARY OF THE INVENTION

This problem is solved by the proposed process for producing an adsorption unit. In a first aspect, a process for producing an adsorption unit is proposed. In this process, an adsorber bed of the adsorption unit is filled with a bed of an adsorbent which is selected from a multitude of adsorbents by a test method. In the test method, a particle of each adsorbent is repeatedly laden with a sorbate and regenerated again. This converts the particle to an aged particle. In addition, a fracture property B of the aged particle of each adsorbent is determined. For the bed, an adsorbent is selected from the multitude of the adsorbents depending on the fracture property B determined.

Such a production process has the particular advantage that the adsorbent used for the bed has a preferred ageing stability. This means, more particularly, that the adsorbent which is selected by means of the test method has improved resistance to ageing processes by comparison with the further adsorbents, while further properties, for example a grain size of the particle and/or a capacity or uptake capacity for the sorbate, are simultaneously maintained. Ageing processes especially include becoming friable, becoming brittle and/or breakup of the particles. Ageing processes of this kind can be caused, for example, by changes of state, especially changes of temperature and/or variations in volume. Variations in the volume of the particles can be caused, for example, by swelling and contraction processes which are triggered, for example, by the uptake and release of a sorbate. An adsorption unit produced by this process consequently has the advantage that maintenance intervals for the adsorption unit are extended since the bed has to be replaced and/or replenished less frequently. This especially helps to lower the operating costs for such an adsorption unit. Moreover, it is possible to reduce any adverse effect, for example damage, caused by discharged fragments of particles of an adsorbent on further industrial apparatuses that may be connected downstream of the adsorption unit. It is also possible to reduce and/or prevent coating and/or blockage of a dust precipitator connected downstream of the adsorption unit. This contributes to reliable operation of an industrial plant.

An adsorption unit is used, for example, for cleaning of a fluid, especially of gases. For example, adsorption units are used in cryogenic air fractionation plants, and these are employed especially for drying of fresh air that has been sucked in. Adsorption units are also used in other industrial plants. Plants of this kind serve, for example, for the obtaining of gases, for example natural gas, hydrogen, synthesis gases, olefins such as ethylene and/or propylene, nitrogen, oxygen, helium, argon and/or further noble gases. In addition, in plants for production of high-purity fluids, adsorption units are used for removal of impurities.

Further possible uses for such an adsorption unit are, for example, as thermal energy storage means, as storage means for the sorbate, especially when it is a volatile sorbate, for example a gas, and as a catalyst unit for chemical reactions. In the case of use of the adsorption unit as a through-flow catalyst unit, reference is made to the catalyst or the catalyst material rather than the adsorbent. A catalyst material may, like an adsorbent, take the form of a bed of particles. The process proposed can therefore achieve the advantageous effects described in catalyst units too.

An adsorption unit especially comprises an adsorber bed, which constitutes a volume in which the adsorbent is arranged. More particularly, such an adsorber bed has an inflow orifice and an outflow orifice through which the fluid to be cleaned can flow in and out. The adsorber bed is filled with a bed of the adsorbent. The bed comprises a large number of particles of a respective adsorbent. The adsorption unit can also be referred to as a reactor.

Adsorbents, also called adsorption agents, are, for example, carbonaceous adsorbents such as activated carbon, activated coke or carbon molecular sieves, oxidic adsorbents such as active aluminas, silica gels, alugels or zeolites, and also polymer adsorbents and organometallic network compounds. Adsorbents preferably have a high porosity, which gives them a high internal surface area. Because of this high internal surface area, many particles, for example impurities, can be sorbed into or onto an adsorbent. The porosity can be reported, for example, as surface area per unit mass. The surface area can be determined, for example, by the BET method to DIN 66 131. Porosity is understood to mean, for example, macroporosity, mesoporosity and microporosity. The division is effected, for example, according to IUPAC (International Union of Pure and Applied Chemistry) by the pore diameter. Pores having a diameter of 0.1-2.0 nm are referred to here as micropores, pores having a diameter of 2.0-50 nm as mesopores, and pores having a diameter of more than 50 nm as macropores. The microporosity in the case of zeolites, for example, arises from the underlying crystal structure. It is mainly in the micropores that the adsorption takes place. Depending on the pore size, only molecules up to a particular size can penetrate into the microporous structure of the adsorbent. The meso- and macropores serve predominantly for transport of the sorbate to the micropores.

Different adsorbents have different pore sizes, for example. The macro- and mesopores can be characterized, for example, by mercury intrusion as described in DIN 66133 or nitrogen adsorption as described in DIN 66134. The micropores can be characterized, for example, by adsorption of a sorbate having known molecule diameter.

In preferred embodiments, the adsorbent is a zeolite. Zeolites are also referred to as molecular sieve, since they are producible with a relatively well-defined pore size. Zeolites especially take the form of aluminosilicates, the empirical formula of which in the completely dry state is, for example, $M_x(AlO_2)_x(SiO_2)_y$ where M is a metal, especially from the group of the alkali metals and/or alkaline earth metals. Industrial zeolite-based adsorbents are formulated, for example, with the aid of inorganic binders. For example, many small zeolite particles, especially zeolite crystals, can be aggregated with the binder to form a larger particle having a suitable shape, for example a sphere or an extrudate of different length and different geometric shapes, for example cylindrical, star-shaped and/or in the form of a regular and/or irregular polygon. This enables the particles of an adsorbent to be essentially homogeneous. These can also be referred to as shaped bodies. Various binders are useful, for example sepiolite, kaolinite, attapulgite or montmorillonite. The selection of a binder can be made depending on costs, processability and especially the properties of the finished particles. The binder especially has a great influence on the fracture property of the particles.

In addition, it is also possible to formulate binder-free adsorbents, in the case of which, for example, a shaped body is formed in a first step from a mixture of adsorbent particles with binder particles of a temporary binder, for example metakaolin. In a second step, the binder is then converted to adsorbent, for example by heating the shaped body.

Interaction of various factors that affect the fracture property is complex. Moreover, the processes and/or mechanisms that lead to ageing of the particles through the loading and regenerating have not been clarified fully. Therefore, optimization of adsorbents with regard to specific demands is barely possible. The proposed process gets round this difficulty, since, even without knowledge of individual correlations of effect and/or substance properties, for example of the binder, it allows the fracture property and the ageing properties of particles of an adsorbent to be determined.

Depending on an application and the demands thereof, various adsorbents may be useful, while others may be unsuitable for the application. Parameters with which an additional optional preliminary selection can take place are, for example, adsorptive properties, particle size, particle size distribution, environmental properties, chemical properties and/or further physical properties. By the process proposed, from a preliminary selection made on the basis of adsorptive properties, for example, that adsorbent which is best suited to the particular application on the basis of its fracture property is filtered out.

An adsorbent is preferably provided in the form of homogeneous particles, for example small beads. This provision form results in simple handling and great flexibility in the arrangement of the adsorbent or a bed of the adsorbent.

The test method comprises the loading and regenerating of a particle of each adsorbent of the multitude of adsorbents under suitable conditions, especially identical or similar conditions to those that occur in the adsorption unit in operation, for example as part of an industrial plant. "Loading" here means more particularly that the adsorbent is laden with a sorbate, for example water. After the loading, the particle is partly or fully saturated with the sorbate. Subsequently, the particle has to be regenerated in order to be able to be laden again. The regenerating of the particle especially comprises partial or complete removal of the sorbate from the particle. The loading and regenerating of the particles can lead, for example, to internal stresses in the particles. These mechanical forces lead to ageing of the particles. For example, microcracks can form, which impair integrity of the particles. Thus, the particles after the test method are aged particles. On account of such ageing, there can be a change in the mechanical properties in particular, for example a fracture property, of the particles. A fracture property especially includes a force which can be exerted on such a particle before the particle breaks up.

Owing to heterogeneity of individual particles of an adsorbent, for example in terms of a particle diameter, a microscale composition and/or further microscopic differences, the test method is preferably not conducted with exactly one particle of each adsorbent but with a multitude of particles of each adsorbent. This enables determination of a mean from a multitude of test results, which permits a more reliable conclusion, for example, as to a mean fracture property of an adsorbent. The mean may be any statistical mean, for example the arithmetic mean, the geometric mean, the harmonic mean, a weighted mean, etc.

The test method especially simulates stress on the particles in actual operation of a plant. In order to test a number of different adsorbents within a minimum period of time and to arrive at a meaningful result, parameter values in the test method are chosen such that accelerated ageing of the particles occurs. By exposing the particles in the test method, for example, to a higher temperature and/or a faster sequence of loading and regeneration operations with a sorbate than is the case in the real operation of the plant, comparatively accelerated ageing is achieved.

In one embodiment of the process, the latter comprises the steps of: providing the multitude of adsorbents, where each adsorbent comprises an amount of particles; determining a compressive strength $\varphi 0$ of the particle. The compressive strength corresponds to the compressive force exerted on the particle at which the particle breaks up. Conducting the test method, wherein, in the test method, a particle of each adsorbent is used to conduct a defined number N1 of test cycles, wherein a test cycle comprises loading the particle with a sorbate with the aid of a fluid laden with the sorbate at a first temperature and then regenerating the laden particle with the aid of a further fluid at a second temperature. This generates aged particles. Determining the compressive strength φN1 of the aged particle of each adsorbent; selecting the adsorbent for which the compressive strength φN1 has decreased the least compared to the compressive strength φ0, wherein the fracture property B determined corresponds to the ratio of the compressive strength φN1 to the compressive strength φ0; and filling the adsorber bed of the adsorption unit with a bed of the selected adsorbent.

In embodiments, the determining of the compressive strength of a particle comprises subjecting the particle to an external compressive force through two surfaces between which the particle is arranged.

The providing of a multitude of adsorbents comprises, for example, ordering different adsorbents from a manufacturer. Preferably, for each adsorbent in the multitude, the compressive strength is determined in the condition as supplied and/or after a fixed pretreatment. The compressive strength of an individual particle can be determined, for example, according to DIN 8948, section 7.3, or else according to ASTM D4179. Alternatively, it is possible to determine the compressive strength of an ensemble of particles. One possible method for this purpose is described, for example, in ASTM D7084-04. The compressive strength determined in this way then corresponds to a statistically averaged compressive strength of individual measurements. More particularly, in the determination of the compressive strength for each adsorbent, the same conditions are used, since the results for different adsorbents are otherwise not comparable. For example, all adsorbents are subjected to a pretreatment, especially a drying operation. The compressive strength can be determined, for example, for an individual particle, by subjecting it to external compressive force, for example by means of two parallel plates. Alternatively, it is possible to use differently shaped compression bodies.

The test method especially comprises test cycles. A single test cycle comprises at least a partial or complete loading of a particle with a sorbate and a regenerating of the laden particle. For loading of the particle with the sorbate, it is exposed to a fluid laden with the sorbate. This is especially effected at a first temperature. This sorbate is sorbed here from the fluid into or onto the particle. This means that the free surface of the particle is populated with molecules of the sorbate. For regeneration of the laden particle, the laden particle is exposed to a further fluid different from the fluid. This is especially effected at a second temperature. The further fluid is, for example, the pure fluid, a regeneration fluid, another sorbate-free fluid and/or another fluid laden with another sorbate. The further fluid may also be the fluid laden with the sorbate at a different temperature. The further fluid has an uptake capacity with respect to the sorbate. This means that the sorbate can be sorbed from or out of the particle into the fluid. This frees the surface of the particle populated with molecules of the sorbate from the sorbate again. Subsequently, the particle is loadable again with the sorbate. The first and second temperatures are chosen depending on the adsorbent and the sorbate. For example, for air, a capacity for moisture rises with rising temperature. In that case, it is advisable to choose the first temperature (loading) at a lower level than the second temperature (regenerating). Preferably, a defined number N1 of these test cycles is conducted with at least one particle of each adsorbent. The defined number comprises, for example, 50 test cycles. More particularly, each adsorbent which is subjected to the test method is subjected to the same number of test cycles. With each test cycle, the particles age in the manner specified above. The degree of ageing therefore depends on the number of test cycles that a particle has gone through.

After running through the defined number N1 of test cycles, the compressive strength φN1 of the aged particle of each adsorbent is determined. The compressive strength φN1 is determined here as already described above in relation to the compressive strength φ0. In order to determine the fracture property B, the compressive strength φN1 determined is expressed as the ratio to the compressive strength φ0. If the compressive strength decreases with increasing ageing, a numerical value for this ratio is within the range from 0 to 1. The greater this ratio, the less the particle has aged. The fracture property B determined thus permits a conclusion about the ageing properties of the adsorbent. For a specific application, it is also possible to define a limit or a threshold below which the fracture property B should not go. For example, it may be required that an adsorbent, if it is to be considered, after running through 50 test cycles, must have a fracture property B of greater than 0.7. For example, from an amount of ten different adsorbents, it is possible to filter out those that meet this condition. In subsequent further tests, the remaining adsorbents can be tested for further properties, in order thus to arrive at an ideal adsorbent for a particular application.

In a further embodiment of the process, the latter comprises the steps of: conducting the test method, wherein, in the test method, a particle of each adsorbent is used to conduct a defined number N1 of test cycles to generate an aged particle; determining the compressive strength φN1 of the aged particle; determining a maximum cross-sectional area A of the aged particle; determining a specific compressive strength φ, where φ=φN1/A. The fracture property B determined corresponds to the specific compressive strength φ determined. Lastly, the adsorbents having a specific compressive strength φ above a defined threshold β are selected, φ≥β.

The maximum cross-sectional area A of an aged particle corresponds to the maximum flat cross-sectional area across the particle. For example, in the case of spherical particles, this corresponds to the area of a circle having the radius of the spherical particles. The specific compressive strength φ determined has the unit $N/m^2$ or else $N/mm^2$. The specific compressive strength φ is therefore especially helpful in comparing particles of different size with one another.

For example, a threshold β of 2 $N/mm^2$, preferably of 2.5 $N/mm^2$, can be fixed. It is thus possible to filter out those adsorbents that do not meet this criterion from a multitude thereof, and these need then be given no further consideration. In further downstream tests, it is then possible to make a further selection from the remaining adsorbents.

In a further embodiment of the process, the latter comprises the steps of: conducting the test method, wherein, in the test method, a particle of each adsorbent is used to conduct a defined number N1 of test cycles to generate the aged particle; determining the compressive strength φN1 of the aged particle of each adsorbent; conducting a defined number N2 of test cycles with a particle of each adsorbent, where N2 is greater than N1, to generate a highly aged particle; determining the compressive strength φN2 of the highly aged particle of each adsorbent; and selecting the adsorbent for which the compressive strength φN2 has decreased the least compared to the compressive strength φN1. The fracture property B determined corresponds here to the ratio of the compressive strength φN2 to the compressive strength φN1.

By such a process, it is advantageously possible to test long-term stability of an adsorbent. For this purpose, the number N2 is chosen, for example, as 10 times, 20 times, 50 times or else 100 times the number N1.

For example, the numbers chosen are N1=50 and N2=1000.

In a further embodiment of the process, the first temperature is lower than the second temperature.

The first temperature corresponds to the temperature on loading, and the second temperature corresponds to the temperature on regeneration of the particles. For example, air, with rising temperature, can take up an increasing amount of water in the form of moisture. Therefore, in the case of an adsorption unit which is used for drying of air, it is advantageous to conduct the air for drying through the adsorbent with a low temperature, for example between 0° C.-20° C. In order to regenerate the adsorption unit, by comparison, air is passed through the adsorbent at an elevated temperature, for example between 200° C.-300° C.

In a further embodiment of the process, the first temperature is between 0° C. and 100° C., preferably between 5° C. and 50° C., further preferably between 15° C. and 30° C. In addition, the second temperature is between 100° C. and 300° C., preferably between 150° C. and 300° C., and further preferably between 200° C. and 250° C.

The preferred temperatures and/or temperature ranges depend on the application. Especially in the case of cryogenic applications, other temperature ranges may be preferred, for example below 0° C.

By such a process, it is possible to ensure that the particles in the test method are stressed to such an extent that accelerated ageing occurs and hence reliable conclusions as to the characteristics of the particles in the operation of a real plant are enabled.

In a further embodiment of the process, the fluid is air and the sorbate is water.

In a further embodiment of the process, the particles of the adsorbents are spherical in shape and have a mean radius of 0.1 mm to 25 mm, preferably 0.5 mm to 10 mm and further preferably 1 mm to 5 mm.

Other shapes are likewise possible, for example cylindrical and/or in the form of regular polyhedrons, for example in cubic form.

In a further embodiment of the process, the adsorbents are 13X zeolite molecular sieve materials having a pore size of 10±2 Å.

13X molecular sieve materials are especially zeolites. The pore size of a zeolite or a molecular sieve material arises from the crystal structure underlying the material, which is in turn dependent on the molecular composition. The crystal structure can be determined by means of structure-resolving test methods, for example by x-ray scattering methods. Molecules larger than the pore size specified cannot penetrate into such a crystal and are therefore adsorbed only in very small amounts.

In a second aspect, a retooling process for an adsorption unit is proposed. In this process, an adsorber bed of the adsorption unit is filled with a bed of an adsorbent which is selected from a multitude of adsorbents by a test method. In the test method, a particle of each adsorbent is repeatedly laden with a sorbate and regenerated again. This converts the particle to an aged particle. In addition, a fracture property B of the aged particle of each adsorbent is determined. For the bed, an adsorbent is selected from the multitude of the adsorbents depending on the fracture property B determined.

Such a retooling process is particularly advantageous when it is found in an existing plant that the adsorbent used is not optimal. In that case, it is then possible by the process proposed, for example, to select an optimal adsorbent from a multitude of adsorbents.

The retooling process especially comprises the process steps mentioned for the production process, such as providing a multitude of adsorbents, determining the compressive strength, conducting the test method and selecting the adsorbent depending on a fracture property determined.

More particularly, the embodiments of the production process are also embodiments of the retooling process.

In a third aspect, an adsorption unit for cleaning fluid laden with a sorbate is proposed. The adsorption unit comprises an adsorber bed filled with a bed of an adsorbent. The adsorption unit has especially been produced by a production process according to the first aspect.

The adsorption unit proposed thus especially comprises a bed of an adsorbent which has been selected by means of the test method according to the first aspect or one of the embodiments of the first aspect.

In one embodiment of the adsorption unit, it takes the form of a radial adsorber. The radial adsorber has an inner basket and an outer basket. The inner basket and the outer basket have each been provided with passage orifices for the fluid to flow through. The adsorbent is arranged in an interstitial space between the inner basket and the outer basket.

Radial adsorbers are especially suitable for large flow volumes. The inner basket and the outer basket are manufactured, for example, from a metal. The inner basket and the outer basket provide the interstitial space which accommodates the bed of the adsorbent. The inner basket and the outer basket thus especially serve to retain the bed of the adsorbent.

In operation of the radial adsorber, the fluid to be cleaned and/or the regeneration fluid flows through the bed.

In a further embodiment of the adsorption unit, the passage orifices are smaller than the particles of the adsorbent.

This embodiment has the advantage that the particles cannot escape from the interstitial space between the inner basket and the outer basket through the passage orifices.

In a further embodiment, at least some of the passage orifices are larger than the particles, in which case the larger passage orifices have a means of retaining the particles.

The means of retaining the particles may, for example, be a wire mesh, a fabric mesh made from synthetic and/or natural material and/or a filter material.

In a further embodiment of the adsorption unit, the radial adsorber is constructed as a two-layer radial adsorber. This has a second adsorber bed arranged in an inflow region of the adsorption unit and filled with a bed of a second adsorbent.

Two-layer adsorbers are especially suitable for removing different sorbates from a fluid in two stages in a single adsorption unit. In the case of a two-layer radial adsorber, the two beds are arranged, for example, in a radially concentric manner. For this purpose, the two-layer radial adsorber has, for example, a middle basket likewise provided with passage orifices between the outer basket and the inner basket. The middle basket can also be omitted. In that case, the bed of the two adsorbents can be introduced in a suitable manner, such that the two layers are formed.

An inflow region of the adsorption unit refers especially to the volume of the adsorption unit in which the fluid first enters an adsorption bed. In the case of a two-layer radial adsorber, this would be, for example, the outer of the two annular volumes provided for accommodation of a bed if the flow direction in operation is from the outside inward. Alternatively, it may also be the inner annular volume if the flow direction is from the inside outward.

In a further embodiment of the adsorption unit, it is set up for cyclical operation. A single operating cycle comprises at least one cleaning mode for provision of clean fluid and at least one regeneration mode for regeneration of the adsorption unit. In the cleaning mode, the fluid laden with the sorbate flows through the adsorption unit, in the course of which the sorbate sorbs from the fluid onto the adsorbent. In the regeneration mode, a regeneration fluid flows through the adsorption unit, in the course of which the sorbate sorbs from the laden adsorbent into the regeneration fluid.

The embodiments of the first aspect are especially also embodiments of the second aspect. More particularly, all the embodiments of the adsorption unit of the second aspect have a bed of an adsorbent which has been selected by an embodiment of the process of the first aspect.

Further possible implementations of the invention also comprise combinations of features or embodiments described above or below with regard to the working examples that have not been specified explicitly. The person skilled in the art will also add individual aspects as improvements or supplementations to the respective basic form of the invention.

BRIEF DESCRIPTION OF THE DRAWINGS

Further advantageous configurations and aspects of the invention form the subject-matter of the dependent claims and of the working examples of the invention described hereinafter. The invention is elucidated in detail hereinafter by preferred embodiments with reference to the appended figures.

DETAILED DESCRIPTION OF THE INVENTION

Figure 1:
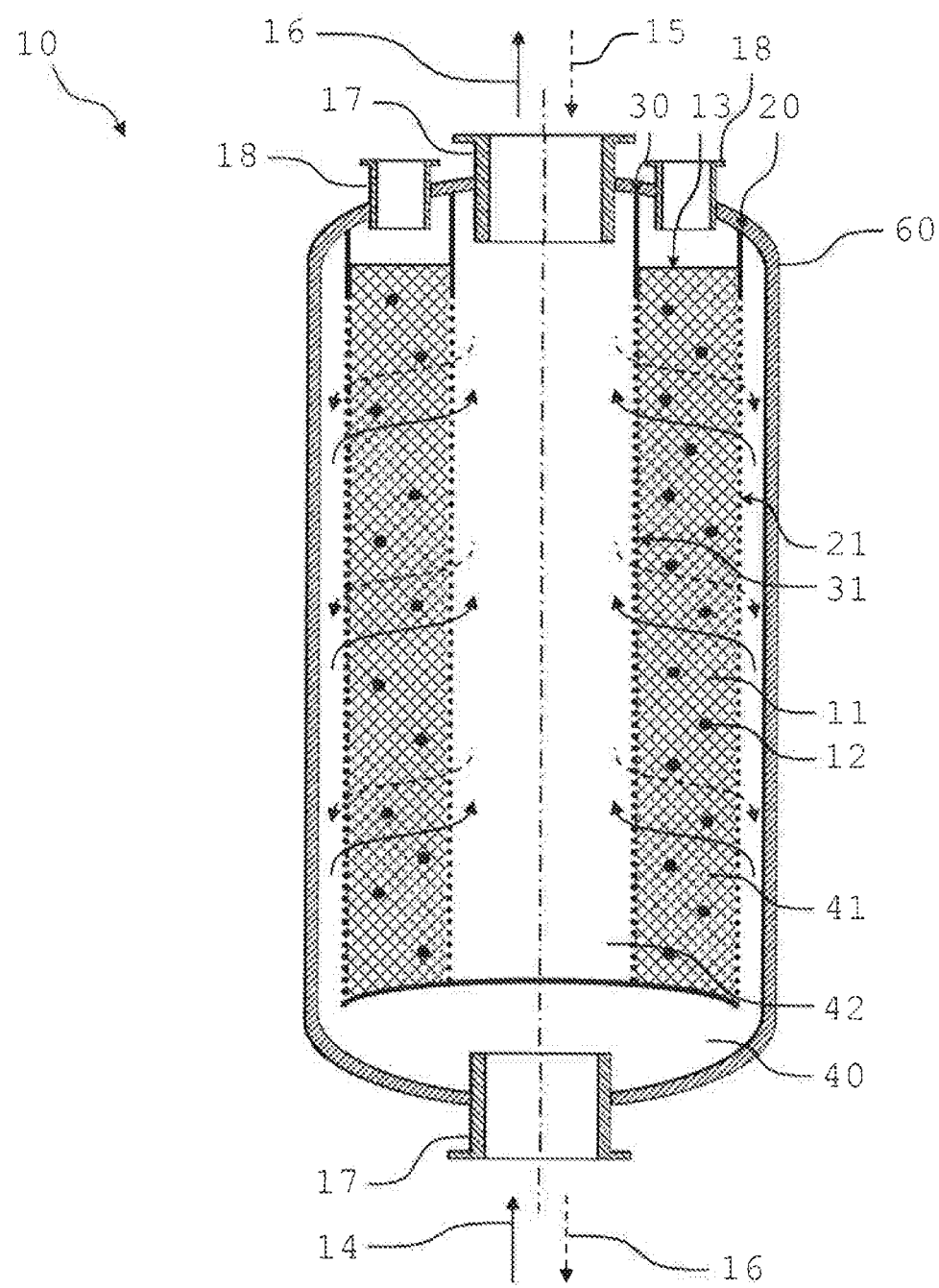
FIG. 1 shows a section through a working example of a radial adsorber.
Figure 4:
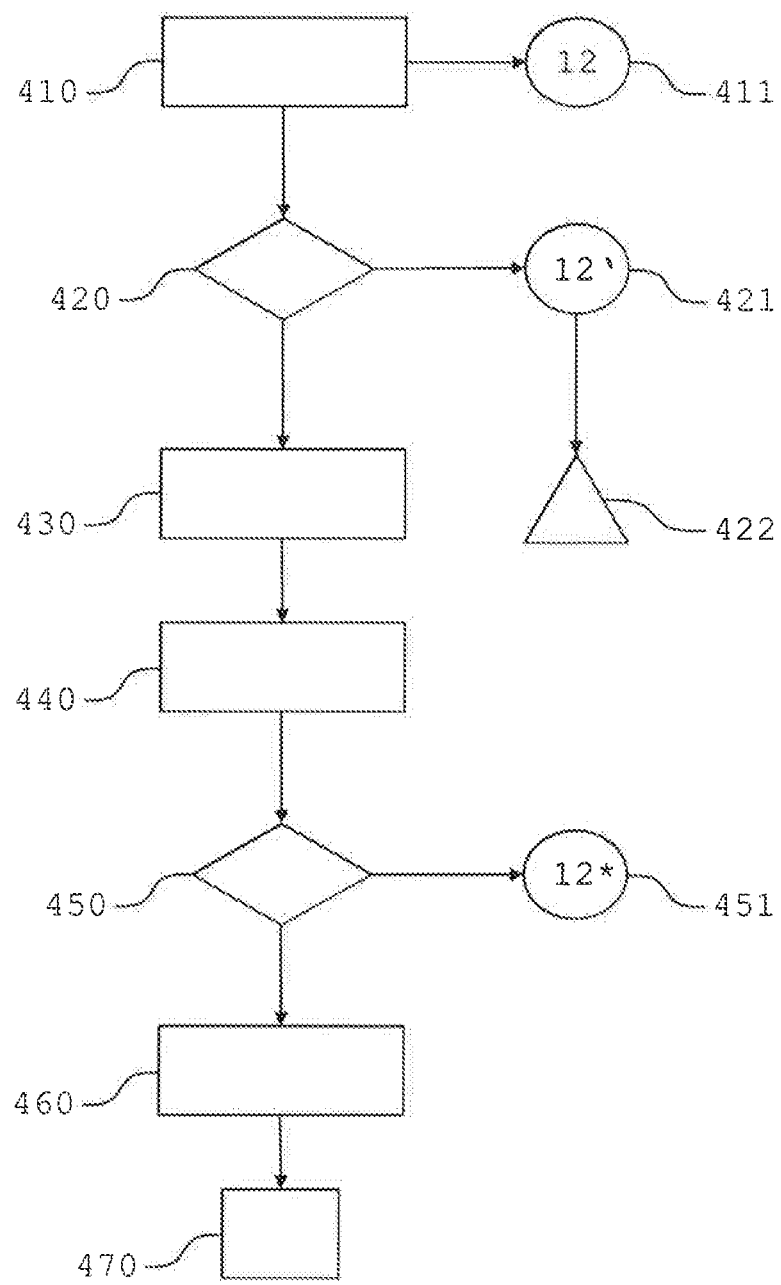
FIG. 4 shows a flow diagram in one working example of the production process.

FIG. 1 shows a working example of an adsorption unit 10 which has been produced by the process as shown, for example, in FIG. 4 and elucidated in relation thereto. More particularly, the adsorbent 11 has been selected from a multitude of adsorbents 11 by means of a test method, wherein, for example, an experimental setup according to FIG. 2 has been used.

The adsorption unit 10 takes the form of a radial adsorber 10. The radial adsorber 10 is constructed from concentrically arranged cylindrical components 20, 30, 60. The components are an outer wall 60, an outer basket 20 encompassed by the outer wall 60, and an inner basket 30 encompassed by the outer basket 20. The space between the inner basket 30 and the outer basket 20 is referred to as adsorber bed 41 and serves to accommodate a bed 13 of the adsorbent 11. The adsorbent is introduced here from the top via filling stubs 18.

In operation of the radial adsorber, the filling stubs are closed. In addition, the radial adsorber has one orifice 17 each at the top and bottom, through which fluid can flow in operation. The radial adsorber 10 has, for example, a height within the range from 3 m to 25 m and a diameter within the range from 2 m to 8 m.

For example, laden fluid 14 is supplied to the outer volume 40 from below. The flow of the laden fluid 14 is indicated here by solid arrows. The outer basket 20 has passage orifices 21. The fluid 14 flows through the passage orifices 21 from the volume 40 into and through the adsorber bed 41 and, via passage orifices 31 in the inner basket 30, enters the inner volume 42 of the radial adsorber 10, whence it can be removed as cleaned fluid 16 via the upper orifice 17 and processed, for example, in a further process (not shown).

The adsorber bed 41 is filled with the bed 13 of the adsorbent 11. The adsorbent 11, the selection of which is elucidated with reference to FIG. 4, consists of particles 12 that are spherical in shape here. FIG. 1 shows the bed 13 as a cross-hatched area, wherein a number of particles 12 are illustrated by way of example. Preferably, the particles 12 occupy the space available, for example, according to a tight sphere packing. The particles 12 here are larger than the passage orifices 21 of the outer basket 20 and larger than the passage orifices 31 of the inner basket 30. Alternatively, it is possible that the passage orifices 21, 31 are larger than the particles 12, in which case the passage orifices 21, 31 are covered, for example, by a mesh or a textile filter (not shown) that restricts fluid flow only to a slight degree and at the same time effectively retains the particles 12.

In cleaning mode of the adsorption unit 10, the laden fluid 14 flows through the adsorbent 11, in the course of which it is cleaned, for example dried. It subsequently passes through the passage orifices 31 of the inner basket 30 into the central cavity 42 of the radial adsorber 10. From this cavity 42, a pipeline connected to the upper orifice 17 conducts the cleaned fluid 16 onward to the next process step (not shown). In regeneration mode, regeneration fluid 15 is supplied, which may, for example, be dry air 15 at an elevated temperature, for example 150° C. In the example of FIG. 1, the flow direction is reversed here, meaning that the regeneration fluid 15 is supplied to the inner volume 42 via the upper orifice 17. The flow of the regeneration fluid is illustrated here by dotted arrows. As the adsorbent 11 flows through the bed 13, the dry air 15 takes up water from the adsorbent 11, as a result of which it is regenerated. Both the loading of the adsorbent 11 with moisture and the subsequent drying of the adsorbent 11 at elevated temperature result in mechanical stresses on the particles 12 of the adsorbent 11. These can break up under this stress. If the fragments of a broken-up particle are smaller than the passage orifices 21, 31 in the inner and/or outer basket, they can be discharged from the bed 13 through these. By selecting the adsorbent 11 from a multitude of adsorbents 11 by means of the process described with reference to FIG. 4, this effect can be minimized. An adsorption unit 10 of this kind therefore has advantages over adsorption units which have not been produced by the process described, since the particles 12 of the adsorbent 11 which is used for the bed 13 have superior ageing properties, especially a particularly advantageous fracture property.

Apart from the representation in FIG. 1, other flow variants are likewise possible, for example identical flow directions in cleaning mode and in regeneration mode.

EP 0 402 783 A1 describes further ways in which a radial adsorber can be structured.

Figure 2:
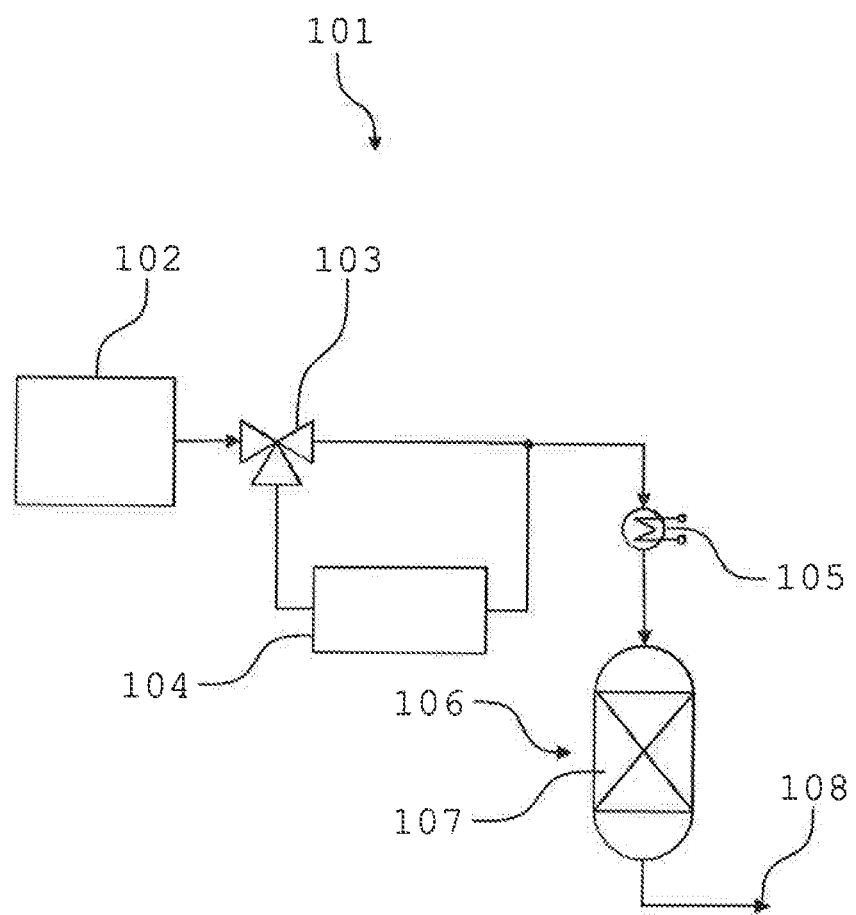
FIG. 2 shows a pipeline and instrument flow diagram of a working example of an experimental setup for conducting test cycles.

FIG. 2 shows a pipeline and instrument flow diagram of a working example of an experimental setup 101 for conducting test cycles 420, 450 (see FIG. 4) for testing an adsorbent 11. With the experimental setup 101 shown in FIG. 2, it is especially possible to select an adsorbent 11 from a multitude of adsorbents 11 which is optimally suited to the production of an adsorption unit 11, especially the radial adsorber 10 according to FIG. 1.

The industrial plant 101 has an air dryer 102 set up to provide a dry air stream. The dry air stream can be supplied via a three-way valve 103 either first to an air moistener 104 or directly to a test tube 106. The air moistener 104 is set up to provide a moisture-saturated air stream. Connected upstream of the test tube 106 is an electrical air heater 105, for example a heating coil 105. The test tube 106 is set up to accommodate a bed 107 of the adsorbent 11 which is subjected to the test. After flowing through the test tube 106, the air stream can be discharged via an outlet 108. In order to subject a multitude of adsorbents simultaneously to a test, it may be the case, for example, that a multitude of test tubes 106 are connected parallel to one another in place of the single test tube 106 (not shown). In addition, it would then also be possible to provide flow monitors (not shown) which ensure that the same amount of fluid flows through each of the test tubes 106.

The composition of a test cycle is, for example, as follows. The starting point is the dry adsorbent 11. By way of preparation, a bed 107 of the adsorbent 11 is weighed into the test tube 106, for example 10 g. The bed thus comprises a multitude of individual particles 12 of the adsorbent 11. Subsequently, moisture-saturated air is guided through the test tube 106. For this purpose, the air dryer 102 generates, for example, an air stream with a volume flow rate of 450 standard l/min. This is guided from the three-way valve 103 to the air moistener 104 in which the dry air is converted to moisture-saturated air. The air has a temperature of 40° C., for example, with the heating coil 105 remaining switched off in this phase. This air stream is guided through the test tube 106 for a total of 30 min. Overall, within this time interval, 13 500 standard l of moist air are guided through the test tube 106 comprising the bed 107 of the adsorbent 11. It is thus ensured that the bed 107 of the adsorbent 11 is fully laden with moisture. Subsequently, the three-way valve 103 is switched, such that the dry air is now supplied directly to the test tube 106. The air stream is reduced here, for example, to 200 standard l/min. The heating coil 105 is then likewise actuated, such that the air, when it flows through the test tube 106 comprising the adsorbent 11, has a temperature, for example, of 300° C. In addition, it is possible that the test tube 106 is heated externally (not shown). As it flows through the adsorbent 11, the dry, heated air takes up moisture from the adsorbent 11, which dries it. After flowing through, the air is discharged via the outlet 108. This operating mode is maintained, for example, for 23 min, such that a total of 4600 standard l of dry air flow through the test tube 106. Subsequently, the bed 107 of the adsorbent 11 is dry.

This test cycle is conducted 50 times, for example. With each cycle, the particles 12 of the adsorbent 11 encompassed by the bed 107 age a little. After running through the 50 test cycles, the compressive strength φ of an aged particle 12' from the bed 107 of the adsorbent 11 is determined.

Figure 3:
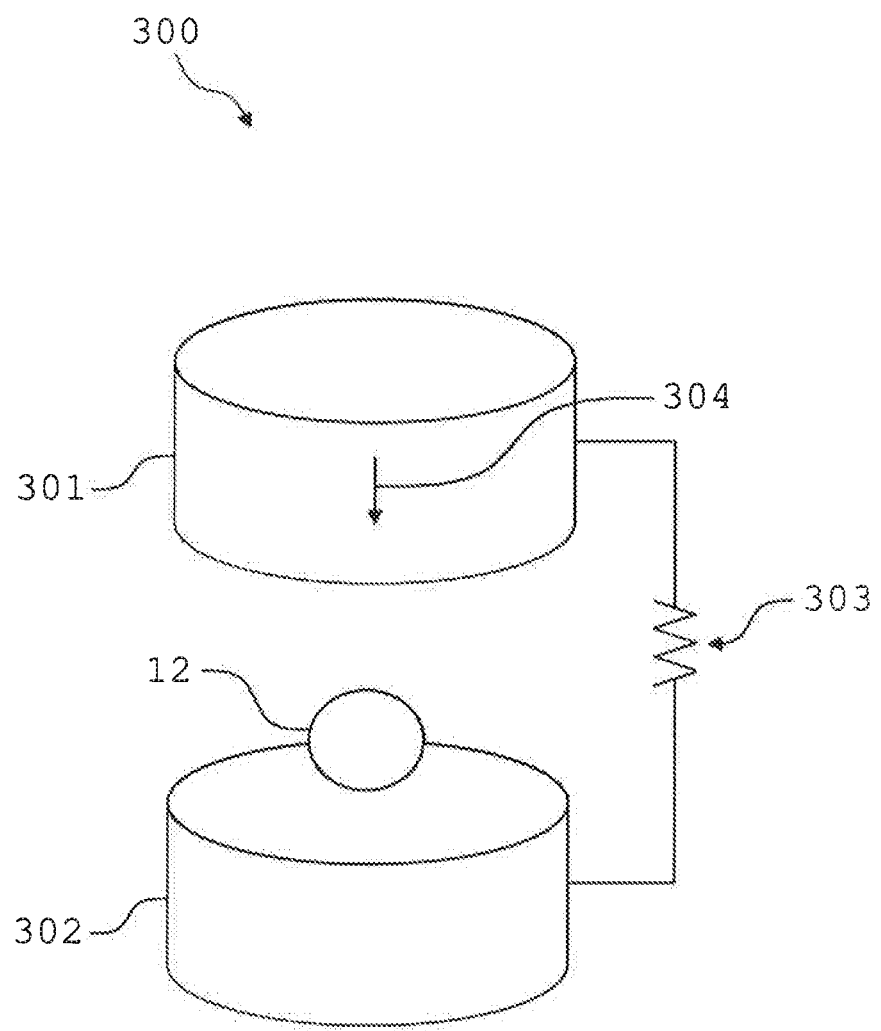
FIG. 3 shows a working example of an experimental setup for determining compressive strength

FIG. 3 shows a working example of an experimental setup 300 for determining the compressive strength of a particle 12, especially in order to determine the fracture property B by the production process (see FIG. 4).

A particle 12 is taken from the adsorbent 11, said particle 12 being yet to go through any test cycle. The particle 12 is placed onto the hard surface of a lower cylinder 302 of a force gauge 300. An upper cylinder 301 is then moved in the direction of the lower cylinder 302 at a constant speed 304, for example 10 mm/min. In the course of this, a force sensor 303 permanently measures the force needed for this purpose. As soon as the hard surface of the upper cylinder 301 touches the particle 12, the particle 12 is clamped between the two cylinders 301, 302, and the particle 12 begins to deform. For this purpose, a particular force is necessary, which is measured by the force sensor 303. Depending on the mechanical stability of the particle 12, it breaks up at a maximum force. This maximum measured force corresponds to the compressive strength φ0 of the particle 12.

Preferably, the compressive strength is measured for a relatively high number of particles 12, for example 20, 50 or even 100 of the particles 12. A statistical data evaluation then allows a more exact statement to be made as to the mean characteristics of an ensemble of particles 12. For example, a bed 13, 107 of an adsorbent 11 constitutes such an ensemble.

In addition, with the experimental setup 300 of FIG. 3, the compressive strength of particles 12 can also be determined after they have run through a number of test cycles, for example in a setup 100 according to FIG. 2.

By determining the compressive strength in various states of ageing, it is possible to make statements as to the ageing characteristics of an adsorbent 11 and hence assess the suitability thereof for a particular application.

There follow three tables which show some experimental results by way of example. Seven adsorbents 11 were subjected here to a test method as described with reference to FIG. 2. The adsorbents 11 are referred to in the tables as samples 1-7. Table 1 shows the experimental conditions during a cycle.

TABLE 1

| Experimental conditions during a cycle. | |
|---|---|
| Loading time | 30 min |
| Regeneration time | 23 min |
| Fluid velocity during loading | 0.76 m/s |
| Fluid velocity during regeneration | 0.34 m/s |
| Heating coil temperature (maximum) | 300° C. |
| Adsorbent temperature (maximum) | 200° C. |

Table 2 shows the specific compressive strength φ determined after running through a particular number of test cycles. The number is in the first row of each column. The adsorbents 11 tested here were spherical particles. The second column of Table 2 indicates the starting value for the specific compressive strength φ0. In this case, the particles 12 were first dried in a nitrogen stream after delivery. Column three states the specific compressive strength φ75 after running through 75 test cycles. It is apparent that all seven samples have a smaller value compared to the starting value. This is as expected, since the particles have aged. Samples 1 and 2 in particular have a small absolute value of only about 25% of the starting value. These samples can now already be excluded according to the selection process. Column four shows the specific compressive strength φ500 determined after running through 500 test cycles for samples 5-7. By comparison with φ75, there are no great changes. The last column indicates the specific compressive strength φ1000 determined after running through 1000 test cycles for samples 3-5. Sample 3 here has the highest value. However, samples 4 and 5 in particular, by comparison with φ75, have an almost stable value, which indicates that these adsorbents have good long-term stability.

TABLE 2

Specific compressive strength φ in N/mm² for the seven samples, determined after a number of test cycles.

| | Cycles | | | |
|---|---|---|---|---|
| | 0 | 75 | 500 | 1000 |
| Sample 1 | 9.2 | 2.2 | — | — |
| Sample 2 | 9.2 | 2.5 | — | — |
| Sample 3 | 12.6 | 10.5 | — | 6.0 |
| Sample 4 | 9.2 | 5.1 | — | 4.5 |
| Sample 5 | 8.0 | 5.1 | 4.6 | 4.7 |
| Sample 6 | 8.8 | 4.3 | 4.6 | — |
| Sample 7 | 8.8 | 5.4 | 4.8 | — |

Finally, table 3 shows a reduced compressive strength for the same seven samples. The reduced compressive strength corresponds to the ratio of compressive strength φN/φ0, where N is the number of test cycles conducted. This ratio is at first 1 for all samples at the start (0 test cycles). With increasing number of test cycles, it is possible to make a statement as to the ageing characteristics independently of absolute values.

TABLE 3

Reduced compressive strength of the seven samples, determined after a number of test cycles.

| | Cycles | | | |
|---|---|---|---|---|
| | 0 | 75 | 500 | 1000 |
| Sample 1 | 1 | 0.24 | — | — |
| Sample 2 | 1 | 0.28 | — | — |
| Sample 3 | 1 | 0.84 | — | 0.47 |
| Sample 4 | 1 | 0.56 | — | 0.49 |
| Sample 5 | 1 | 0.64 | 0.57 | 0.59 |
| Sample 6 | 1 | 0.49 | 0.53 | — |
| Sample 7 | 1 | 0.61 | 0.54 | — |

FIG. 4 shows a flow diagram of a working example for a production process for an adsorption unit 10. For example, the radial adsorber 10 of FIG. 1 or else the two-layer radial adsorber 50 of FIG. 5 were produced by this process.

This process comprises the steps of: providing 410 a selection of different adsorbents 11. For example, adsorbents 11 from different suppliers are to be compared. In that case, for example, samples of two different adsorbents 11 are ordered from each supplier. The samples supplied are dried, for example, in a drying cabinet, such that all samples are in a comparable starting condition.

Then, for each sample, the compressive strength φ0 of a particle 12 is determined 411, for example with an experimental setup 300 of FIG. 3.

Subsequently, a bed 107 of each sample is subjected 420 to a number of 75 test cycles. The test cycles are conducted, for example, according to the experimental setup 101 of FIG. 2 and the process described therein. This ages the particles 12 present in the bed 107.

Subsequently, the compressive strength φ75 of an aged particle 12' of each sample is determined 421.

In a first selection step 430, the fracture property B corresponding to the ratio of the compressive strength φ75 to the compressive strength φ0 is determined. Even now, it is possible to rule out adsorbents having a fracture property B below a lower threshold, for example, and so the test method can be continued with fewer samples, which can especially minimize the time demands.

The compressive strength φ75 and the maximum cross section A of the aged particles 12' are used to determine 422 the specific compressive strength φ of the aged particles 12'.

In a second selection step 440, the fracture property B corresponding to the specific compressive strength φ is determined and those samples having a specific compressive strength φ above a threshold value β are selected. Those samples that are below the threshold value need not be given any further consideration.

Subsequently, a further bed 107 of the remaining samples is subjected 450 to a number of 500 test cycles. The test cycles are conducted as before. This significantly ages the particles 12 of the bed 107.

Subsequently, the compressive strength φ500 of a significantly aged particle 12* of each sample is determined 451.

In the last selection step 460, the fracture property B' corresponding to the ratio of the compressive strength φ500 to the compressive strength φ0 is determined and compared with the fracture property B. That adsorbent 11 having the fracture property B° that has decreased the least compared to the fracture property B is selected. This can also be worded such that the adsorbent selected is that of which the compressive strength φ500 has decreased the least compared to the compressive strength φ75.

Lastly, an adsorber bed 41 of a prefabricated adsorption unit 10, for example with a construction as described with reference to FIG. 1, is filled with a bed 13 of the selected adsorbent 11. Thus, the production process is complete and the adsorption unit 10 can be used in an industrial plant, for example.

An adsorption unit 10 produced by this process has the advantageous property that a maintenance interval has been extended and hence operating costs have been reduced.

Figure 5A:
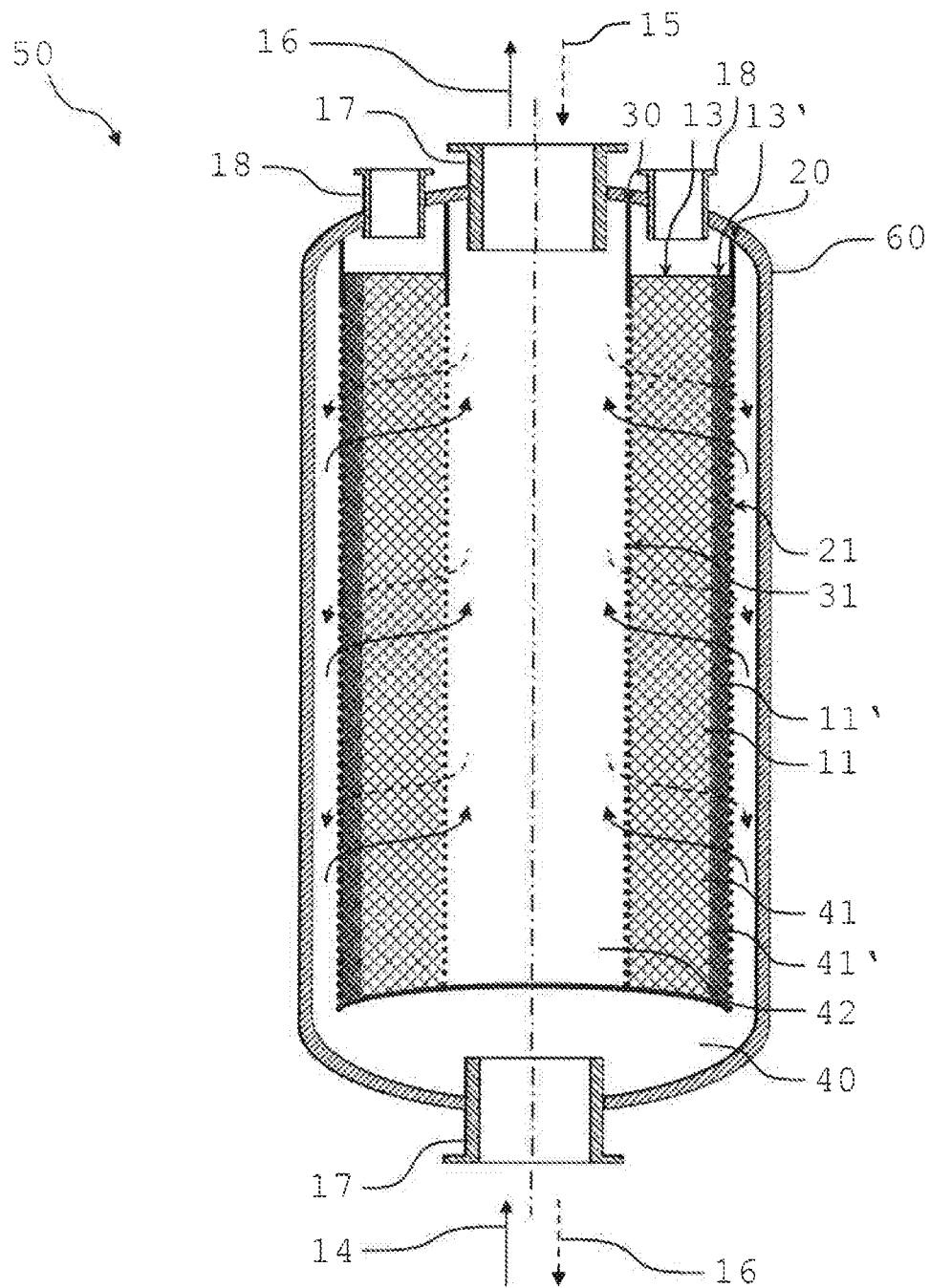
FIG. 5A shows a section through a working example of a two-layer radial adsorber.

FIG. 5A shows a further working example of an adsorption unit 50, which takes the form here of a two-layer radial adsorber 50. This was produced by the process described with reference to FIG. 4. The two-layer radial adsorber 50 has the same features as the radial adsorber 10 of FIG. 1, with the space between the outer basket 20 and the inner basket 30 divided into two adsorber beds 41, 41' by a middle basket 50 (see FIG. 5B). The adsorber beds 41, 41' have been filled with beds 13, 13' of different adsorbents 11, 11'. For reasons of clarity, representation of individual particles of the adsorbents 11, 11' has been dispensed with in FIGS. 5A and 5B. The effect of this setup is that a fluid 14 which is supplied to the outer volume 40, for example, flows sequentially first through the adsorber bed 41' filled with a bed 13' of the adsorbent 11', and then flows through the adsorber bed 41 filled with a bed 13 of the adsorbent 11, before entering the inner volume 42. This enables a two-stage cleaning operation of a fluid 14. It is possible here for the two cleaning stages to be used for cleaning of different impurities, or else different adsorbents 11, 11' having different properties can be used for the same impurity. More particularly, both adsorbents 11, 11' have been selected from a multitude of adsorbents by means of a test method as described with reference to FIGS. 2-4. The parameters, for example threshold values for the fracture property B, may be different here for the two adsorbents 11, 11'. The two-layer radial adsorber 50 can likewise be regenerated as explained with reference to the radial adsorber 10 of FIG. 1.

Figure 5B:
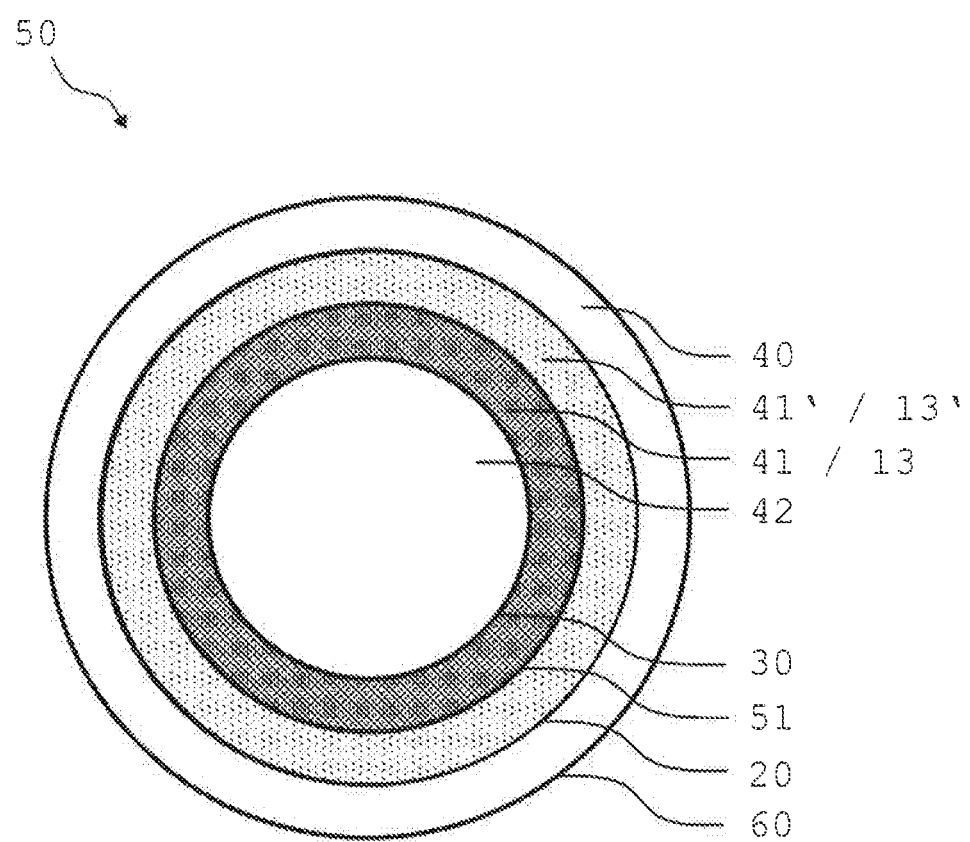
FIG. 5B shows a cross section through the two-layer radial adsorber of FIG. 5A.

FIG. 5B shows a cross section through the two-layer radial adsorber 50 of FIG. 5A which has been produced by a process as described with reference to FIG. 4. The two-layer radial adsorber 50 has the same features as the radial adsorber 10 of FIG. 1, with the additional presence of a middle basket 51. The middle basket 51, like the outer basket 20 and the inner basket 30 as well, has flow orifices for the fluid to flow through (not shown). The middle basket 51 divides the volume 41 of the radial adsorber 10 (see FIG. 1) into two volumes 41, 41'. The two volumes 41, 41' may be filled, for example, with two different adsorbents 11, 11'.

The adsorption units 10, 50 shown in FIGS. 1 and 5, owing to the production process by which they have been produced, have the advantage that a maintenance interval is extended and hence operating costs are lowered. In addition, material is saved, which enables more sustainable operation. Moreover, it is possible to reduce any adverse effect, for example damage, caused by discharged fragments of particles 12 of an adsorbent 11 on further industrial apparatuses that may be connected downstream of the adsorption unit 10, 50. This contributes to reliable operation of an industrial plant.

REFERENCE SIGNS USED

10 adsorption unit
11 adsorbent
11' adsorbent
12 particle
13 bed
13' bed
14 fluid (laden)
15 regeneration fluid
16 cleaned fluid, offgas
17 orifice
18 filling stub
20 outer basket
21 passage orifices
30 inner basket
31 passage orifices
40 volume
41 adsorber bed
41' adsorber bed
42 volume
50 two-layer radial adsorber
51 middle basket
60 outer wall
101 experimental setup
102 air dryer
103 three-way valve
104 air moistener
105 electrical air heater
106 test tube
107 bed of the adsorbent to be tested
108 offgas
300 force gauge
301 upper cylinder
302 lower cylinder
303 force sensor
304 velocity/direction
410 providing
411 determining the compressive strength
420 conducting a number of test cycles
421 determining the compressive strength
430 selecting
431 determining the fracture area
440 selecting
450 conducting a number of test cycles
451 determining the compressive strength
460 selecting
470 filling

What we claim is:

1. A process for producing an adsorption unit, said process comprising:
    providing a plurality of different adsorbents, wherein each adsorbent comprises an amount of particles;
    determining a compressive strength $\varphi 0$ of a particle of each adsorbent, wherein the compressive strength corresponds to the compressive force exerted on the particle at which the particle breaks up;
    conducting a test method, wherein, in the test method, a particle of each adsorbent is repeatedly (a) laden with a sorbate and (b) regenerated again, which converts the particle to an aged particle, and a fracture property B of the aged particle of each adsorbent is determined; and
    filling an adsorber bed of an adsorption unit with a bed of an adsorbent selected by said test method,
    wherein the test method comprises:
    using a particle of each adsorbent to conduct a defined number N1 of test cycles, wherein a test cycle comprises loading the particle with a sorbate with the aid of a fluid laden with the sorbate at a first temperature and then regenerating the laden particle with the aid of a further fluid at a second temperature to generate aged particles of each adsorbent;
    determining the compressive strength $\varphi N1$ of the aged particle of each adsorbent; and
    selecting the adsorbent for which the compressive strength $\varphi N1$ has decreased the least compared to the compressive strength $\varphi 0$, wherein the fracture property B determined corresponds to the ratio of the compressive strength $\varphi N1$ to the compressive strength $\varphi 0$.

2. The process according to claim 1, wherein the first temperature is lower than the second temperature.

3. The process according to claim 1, wherein the first temperature is between 0° C. and 100° C., and the second temperature is between 100° C. and 300° C.

4. The process according to claim 3, wherein the first temperature is between 5° C. and 50° C.

5. The process according to claim 3, wherein the first temperature is between 15° C. and 30° C.

6. The process according to claim 3, wherein the second temperature is between 150° C. and 300° C.

7. The process according to claim 3, wherein the second temperature is between 200° C. and 250° C.

8. The process according to claim 1, wherein the fluid is air and the sorbate is water.

9. The process according to claim 1, wherein the particles of the adsorbents are spherical in shape and have a mean radius of 0.1 to 25 mm.

10. The process according to claim 9, wherein the particles of the adsorbents have a mean radius of 0.5 mm to 10 mm.

11. The process according to claim 9, wherein the particles of the adsorbents have a mean radius of 1 mm to 5 mm.

12. The process according to claim 1, wherein the plurality of adsorbents are each 13X zeolite molecular sieve materials having a pore size of 10±2 Å.

13. The process according to claim 1, wherein said process is used to replace an adsorber bed in an existing adsorption unit.

14. A process for producing an adsorption unit, said process comprising:
    providing a plurality of different the multitude of adsorbents, wherein each adsorbent comprises an amount of particles;

determining a compressive strength φ0 of a particle of each adsorbent, wherein the compressive strength corresponds to the compressive force exerted on the particle at which the particle breaks up;

conducting a test method, wherein, in the test method, a particle of each adsorbent is repeatedly (a) laden with a sorbate and (b) regenerated again, which converts the particle to an aged particle, and a fracture property B of the aged particle of each adsorbent is determined; and filling an adsorber bed of an adsorption unit with a bed of an adsorbent selected by said test method, wherein the test method comprises:

subjecting a particle of each adsorbent to a defined number N1 of test cycles to generate aged particles of each adsorbent;

determining a compressive strength φN1 for the aged particle of each adsorbent;

determining a maximum cross-sectional area A for the aged particle of each adsorbent;

determining a specific compressive strength φ for the aged particle of each adsorbent, where φ=φN1/A; and selecting the on the basis of the specific compressive strength φ being above a defined threshold β, φ≥β, where the fracture property B determined corresponds to the specific compressive strength φ.

15. The process according to claim 14, wherein the threshold β is 2 N/mm².

16. The process according to claim 14, wherein the threshold β is 2.5 N/mm².

17. A process for producing an adsorption unit, said process comprising:

providing a plurality of different the multitude of adsorbents, wherein each adsorbent comprises an amount of particles;

determining a compressive strength φ0 of a particle of each adsorbent, wherein the compressive strength corresponds to the compressive force exerted on the particle at which the particle breaks up;

conducting a test method, wherein, in the test method, a particle of each adsorbent is repeatedly (a) laden with a sorbate and (b) regenerated again, which converts the particle to an aged particle, and a fracture property B of the aged particle of each adsorbent is determined; and filling an adsorber bed of an adsorption unit with a bed of an adsorbent selected by said test method, wherein the test method comprises:

subjecting a particle of each adsorbent to a defined number N1 of test cycles to generate aged particles of each adsorbent;

determining a compressive strength φN1 for the aged particle of each adsorbent;

conducting a defined number N2 of test cycles with a particle of each adsorbent, with N2>N1, to generate highly aged particles of each adsorbent;

determining the compressive strength φN2 of the highly aged particle of each adsorbent; and selecting the adsorbent for which the compressive strength φN2 has decreased the least compared to the compressive strength φN1, wherein the fracture property B determined corresponds to the ratio of the compressive strength φN2 to the compressive strength φN1.

* * * * *